United States Patent
Liu

(10) Patent No.: US 8,289,398 B2
(45) Date of Patent: Oct. 16, 2012

(54) SYSTEM AND METHOD FOR TESTING A CAMERA MODULE OF AN ELECTRONIC DEVICE

(75) Inventor: Qing-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 352 days.

(21) Appl. No.: 12/756,876

(22) Filed: Apr. 8, 2010

(65) Prior Publication Data

US 2011/0102603 A1     May 5, 2011

(30) Foreign Application Priority Data

Nov. 2, 2009  (CN) .......................... 2009 1 0309221

(51) Int. Cl.
*H04N 17/00*       (2006.01)
*H04N 5/225*       (2006.01)

(52) U.S. Cl. .................................... 348/187; 348/220.1

(58) Field of Classification Search .................. 348/187, 348/188, 175, 176, 220.1, 221.1; 702/116
See application file for complete search history.

(56) References Cited

U.S. PATENT DOCUMENTS

| | | | |
|---|---|---|---|
| 4,837,628 A * | 6/1989 | Sasaki ........................ 348/220.1 |
| 7,230,641 B2 * | 6/2007 | McKain et al. .......... 348/207.99 |
| 7,532,247 B2 * | 5/2009 | Kamoda et al. .............. 348/373 |
| 7,598,996 B2 * | 10/2009 | Wenstrand et al. .......... 348/353 |
| 8,089,538 B2 * | 1/2012 | Kitani ........................... 348/246 |
| 2004/0169768 A1 * | 9/2004 | Lee et al. ...................... 348/362 |
| 2004/0201749 A1 * | 10/2004 | Malloy Desormeaux ............ 348/231.99 |
| 2009/0167862 A1 * | 7/2009 | Jentoft et al. ................. 348/143 |
| 2010/0020180 A1 * | 1/2010 | Hill et al. ...................... 348/188 |

* cited by examiner

*Primary Examiner* — Victor Kostak
(74) *Attorney, Agent, or Firm* — Altis Law Group, Inc.

(57) ABSTRACT

A method for testing a camera module of an electronic device includes following blocks. An analysis module and a control module are installed in the electronic device. A test fixture is utilized to secure the electronic device. The control module instructs the camera module to capture a video and a photo. The analysis module automatically examines whether the video and the photo fall within predetermined parameters. A system associated with above method for testing the camera module of the electronic device is also disclosed.

14 Claims, 5 Drawing Sheets

SYSTEM AND METHOD FOR TESTING A CAMERA MODULE OF AN ELECTRONIC DEVICE

This application is related to a co-pending U.S. patent application Ser. No. 12/701,550, filed on Feb. 6, 2010, entitled "SYSTEM AND METHOD FOR TESTING IMAGE CAPTURING FUNCTION OF AN ELECTRONIC DEVICE".

The present application and the co-pending application are assigned to the same assignee.

BACKGROUND

1. Technical Field

The present disclosure relates to a system and method for testing a camera module of an electronic device.

2. Description of Related Art

Today, more electronic devices, (e.g., cell phones, PDAs, notebook computers) have camera modules capable of capturing videos and still-pictures. In order to provide qualified electronic devices to consumers, it is necessary to examine whether the videos and still-pictures captured by the electronic devices are satisfactory.

One typical method to test a camera module of an electronic device includes following steps: capturing a video and a still-picture; and manually inspecting whether the video and the still-picture have any visible defect to determine whether the camera module of the electronic device functions satisfactorily. However, the typical test method needs operators to inspect manually, the video and the still-picture captured by the electronic device, which is inefficient, and the test result may be not accurate.

Therefore, a test system and method for testing a camera module of an electronic device efficiently and accurately is desired.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic imbedded in hardware or firmware, or to a collection of software instructions, written in a programming language, such as, Java, C, or assembly. One or more software instructions in the modules may be imbedded in firmware, such as an EPROM. It will be understood that modules may comprise of connected logic units, such as gates and flip-flops, and may also be comprised of programmable units, such as programmable gate arrays or processors. The modules described herein may be implemented as either software and/or hardware modules and may be stored in any type of computer-readable medium or other computer storage device.

Figure 1:
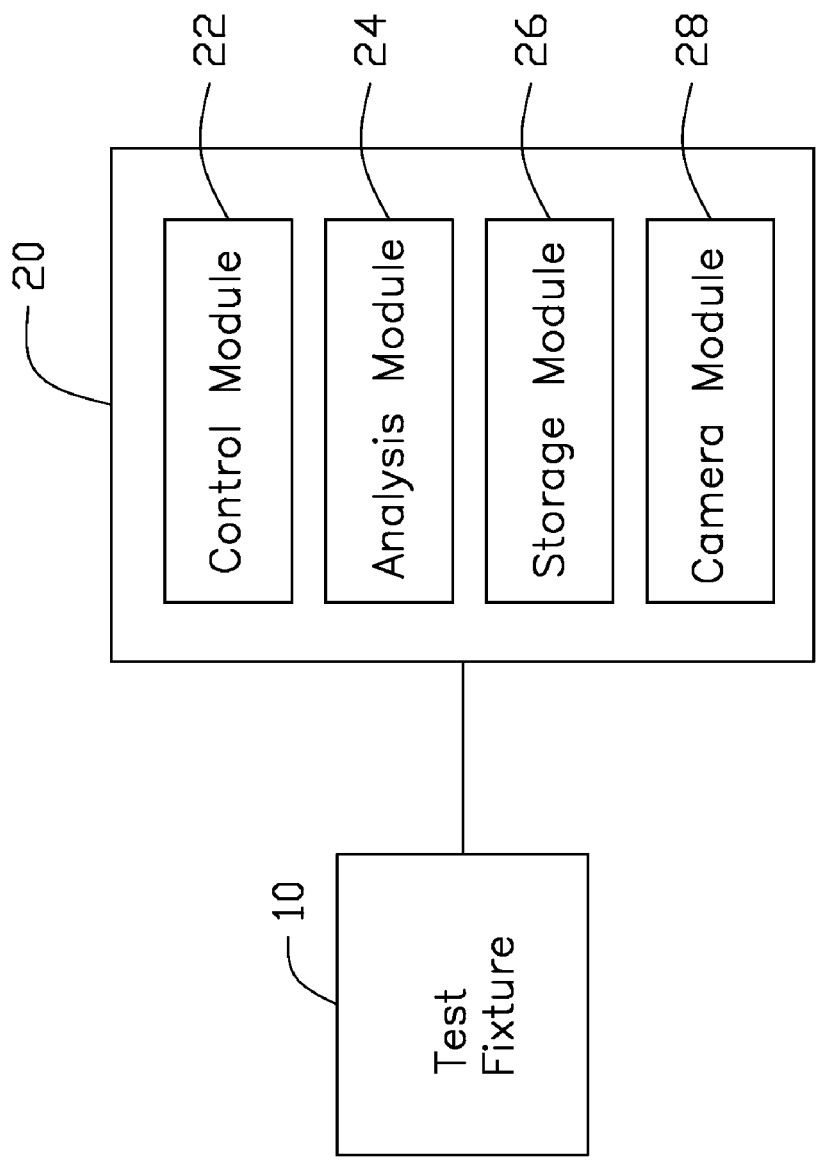
FIG. 1 is a block diagram of a test system for testing a camera module of an electronic device according to one embodiment.

Referring to FIG. 1, an embodiment of a test system includes a test fixture 10 and an electronic device 20 to be tested. In one embodiment, the electronic device 20 is a notebook computer, a cell phone, or a PDA, which has the ability of capturing videos and photos. The test system is capable of testing whether the videos and photos captured by the electronic device 20 satisfy predetermined requirements.

Figure 2:
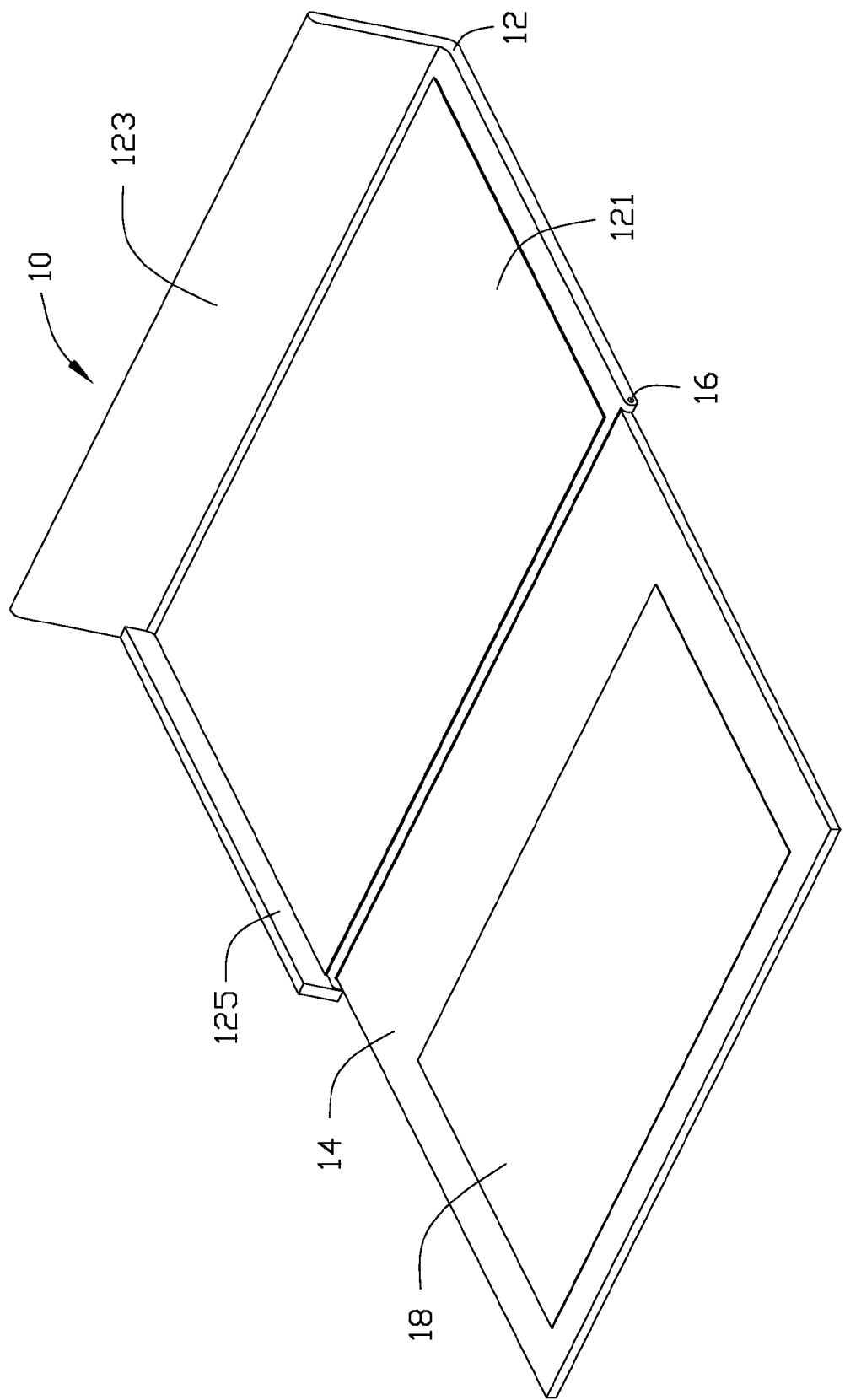
FIG. 2 illustrates a mechanical structure of a test fixture according to one embodiment.

Referring to FIG. 2, the test fixture 10 includes a seat 12 and a pivotable panel 14 pivotally attached to the seat 12. The seat 12 includes a base panel 121 for supporting the electronic device 20, a rear flange panel 123 extending from a rear edge of the base panel 121, and a side flange panel 125 extending from a side edge of the base panel 121. A height of the side flange panel 125 is less than that of the rear flange panel 123. The pivotable panel 14 pivotally attaches to a front side of the base panel 121 via a pivot 16 and is capable of being fixed at a desired angle by static friction. Attached on an inner side of the pivotable panel 14 is a display screen 18, (or other object for capture by the camera module 28). The display screen 18 provides motion pictures, and the electronic device 20 is capable of capturing a video and a photo of the display screen 18.

The electronic device 20 includes a control module 22, an analysis module 24, a storage module 26, and a camera module 28 for capturing videos and photos.

The control module 22 is capable of instructing the camera module 28 to capture a video and a photo. The storage module 26 can store the video and the photo captured by the electronic device 20, and store an exemplar video and an exemplar picture captured by a sample electronic device. The sample electronic device has the same hardware and software configuration as the electronic device 20 and can capture satisfactory video and photos. The analysis module 24 is configured to compare the video and the photo captured by the electronic device 20 with the exemplar video and picture to determine whether the image and video capturing function of the electronic device 20 is qualified.

During testing the camera module 28 of the electronic device 20, the electronic device 20 is placed on the base panel 121 and secured by the rear flange panel 123 and the side flange panel 125. The pivotable panel 14 rotates to an appropriate angle and can be fixed there by the static friction. Then, the camera module 28 enables to capture the video and/or the photo of the display screen 18 attached on the pivotable panel 14. After the video and the photo are captured, the analysis module 24 automatically compares the video and/or the photo captured by the electronic device 20 with the exemplar video and/or picture. If differences between the video and/or photo and the exemplar video photo fall within a predetermined range, the test is passed; otherwise, the test is failed.

Figure 3:
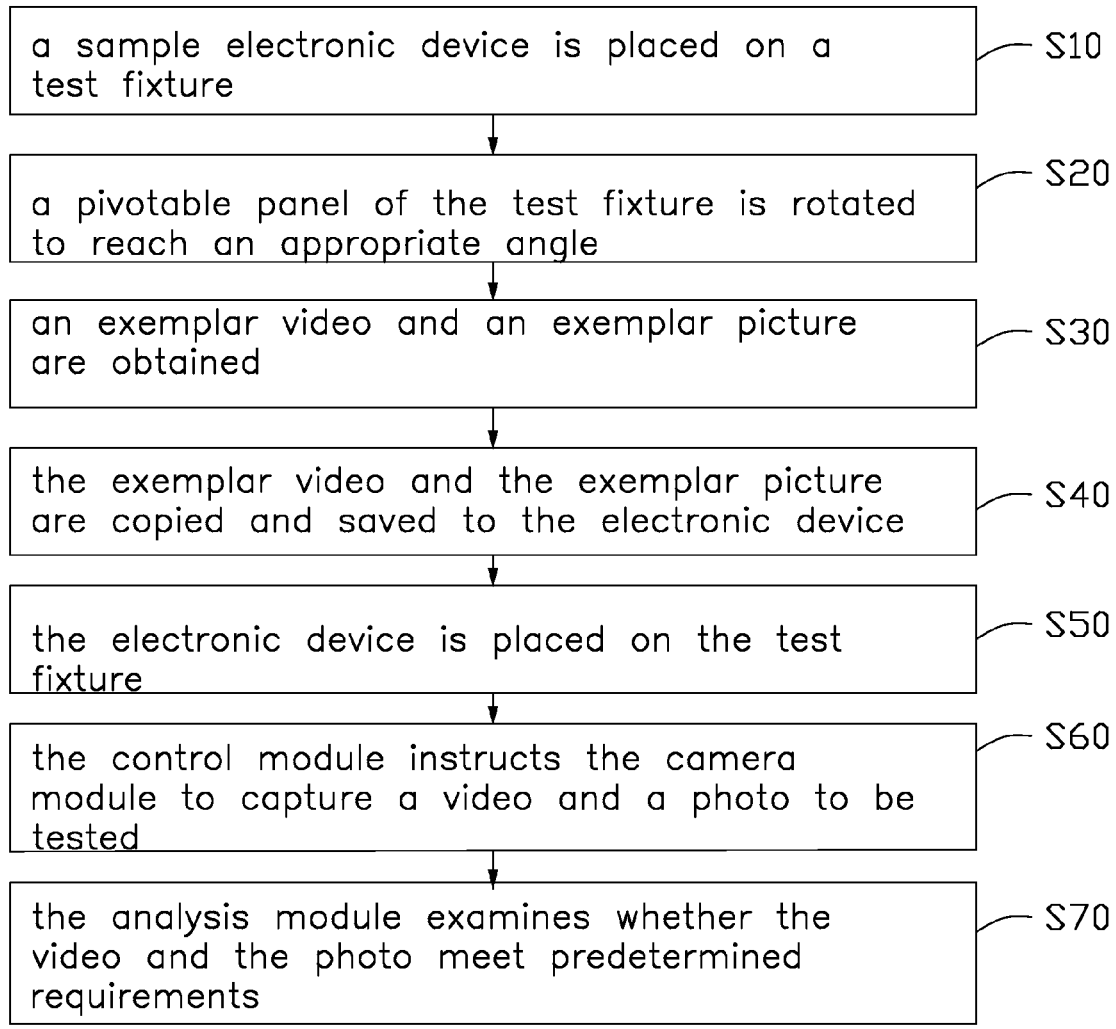
FIG. 3 is a flowchart of a method for testing a camera module of an electronic device according to one embodiment.

Referring to FIG. 3, an operational sequence, according to one embodiment of above described test system, includes following blocks.

In block S10, the sample electronic device is placed on the base panel 121 of the test fixture 10 and secured by the rear flange panel 123 and the side flange panel 125.

In block S20, the pivotable panel 14 with the display screen 18 attached thereon rotates to reach an appropriate angle.

In block S30, an exemplar video and an exemplar picture are obtained.

In block S40, the exemplar video and the exemplar picture are copied and saved to the storage module 26 of the electronic device 20.

In block S50, the electronic device 20 is placed on the seat 12 of the test fixture 10 in the same position as the sample electronic device.

In block S60, the control module 22 of the electronic device 20 instructs the camera module 28 to capture a video and a photo to be tested.

In block S70, the analysis module 24 of the electronic device 20 examines whether the video and the photo meet predetermined requirements.

Figure 4:
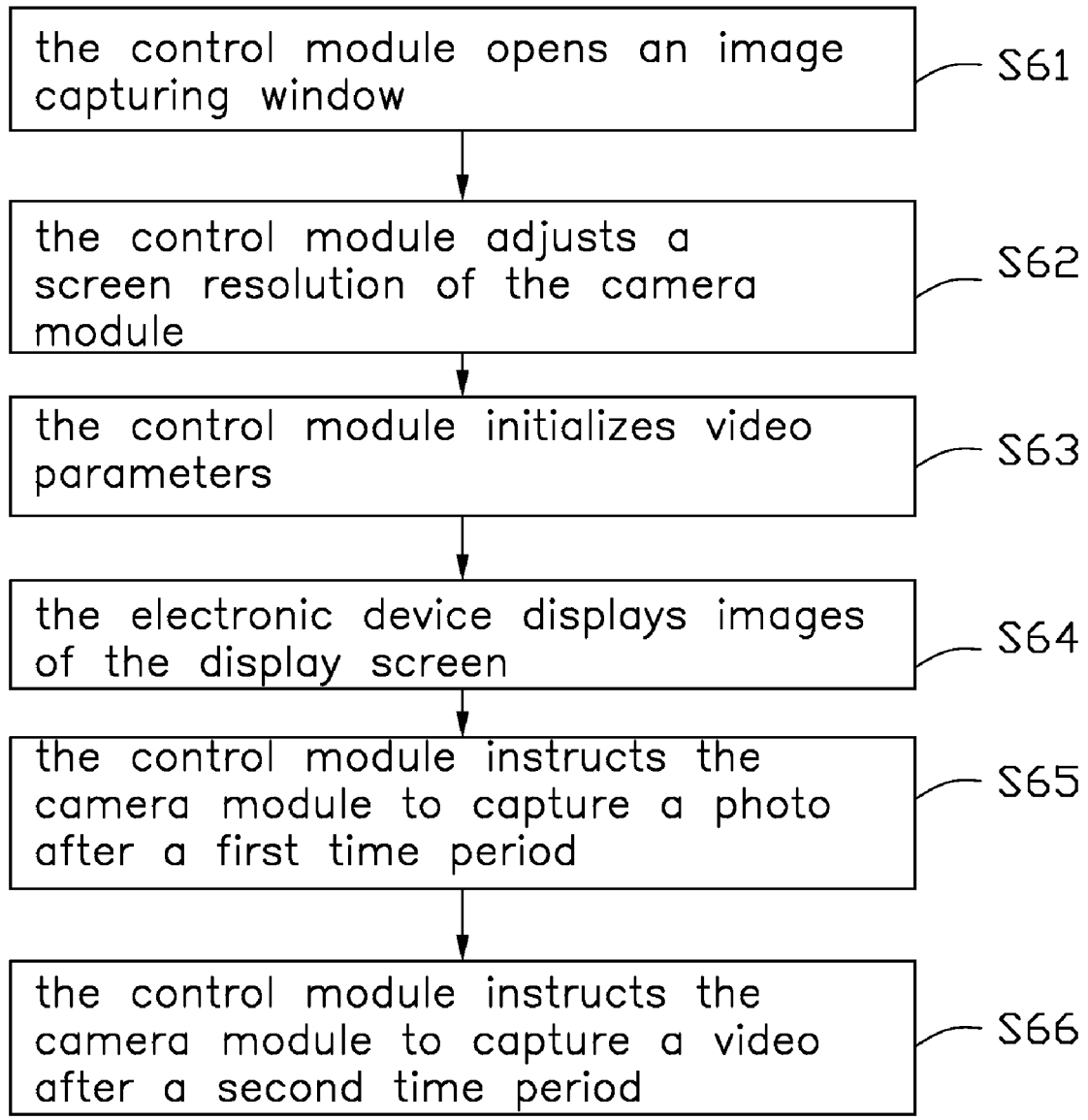
FIG. 4 is a detailed flowchart of block S70 in FIG. 3.

Referring to FIG. 4, the block S60 described above includes following blocks:

In block S61, the control module 22 of the electronic device 20 opens an image capturing window.

In block S62, the control module 22 of the electronic device 20 adjusts a screen resolution of the camera module 28. In one embodiment, the screen resolution of the camera module 28 is adjusted to a maximum value (e.g., 1280 by 1024 pixels).

In block S63, the control module 22 of the electronic device 20 initialize video parameters. The video parameters include video rate, video overlay, video source, video format, etc.

In block S64, the image capturing widow displays images of the display screen 18.

In block S65, the control module 22 of the electronic device 20 sends an instruction to the camera module 28 after a first time period (e.g., one second) for instructing the camera module 28 to capture a photo to be tested.

In block S66, the control module 22 of the electronic device 20 sends another instruction to the camera module 28 after a second time period (e.g., one minute), for instructing the camera module 28 to capture the video to be tested. The video includes a plurality of motion pictures called frames.

Figure 5:
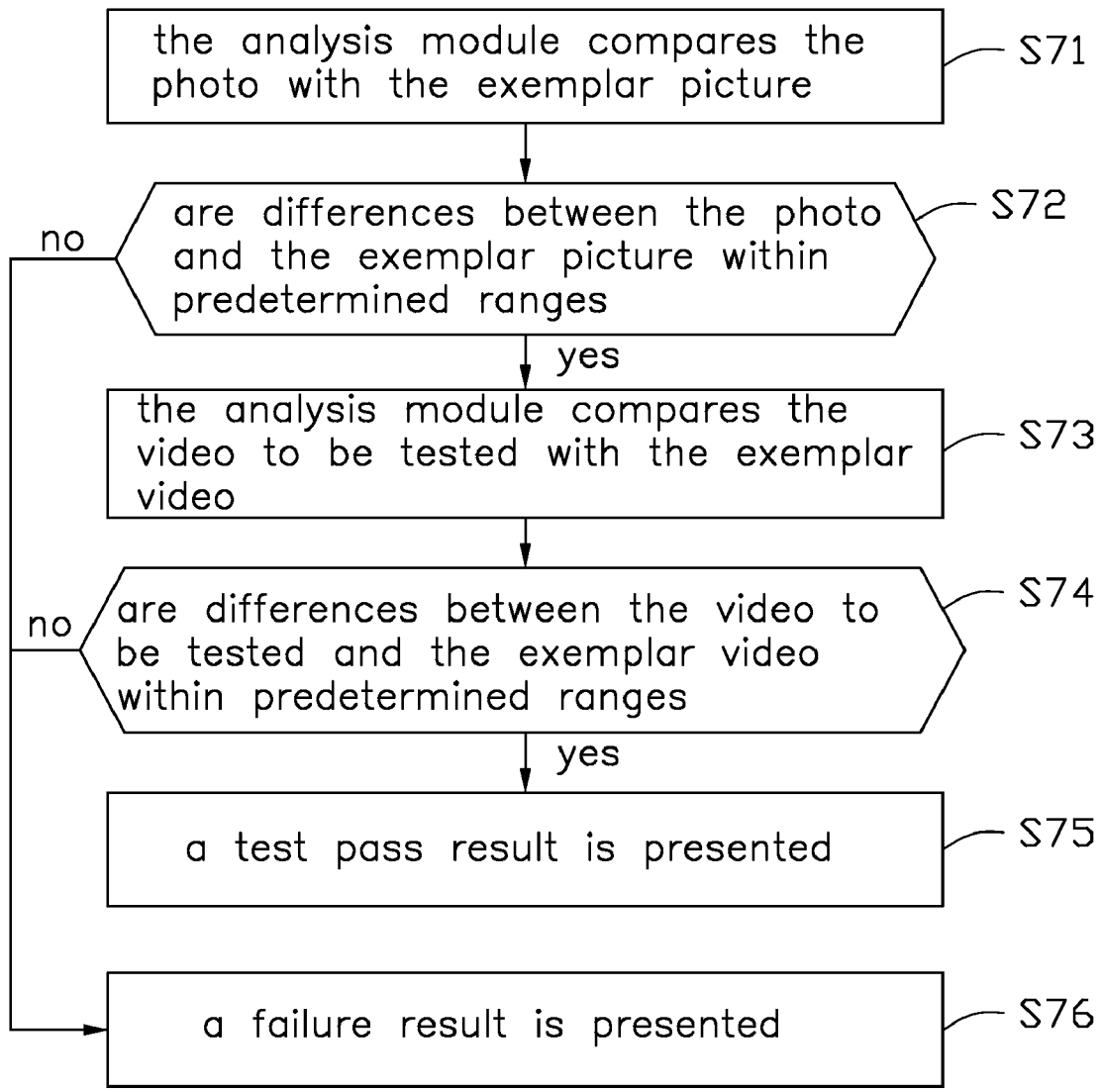
FIG. 5 is a detailed flowchart of block S80 in FIG. 3.

Referring to FIG. 5, the block S70 described above further includes following blocks:

In block S71, the analysis module 24 installed in the electronic device 20 compares the photo with the exemplar picture provides by the sample electronic device.

In block S72, it is determined whether differences between the photo and the exemplar picture fall within predetermined ranges. If differences between the photo and the exemplar picture fall within predetermined ranges, go to block S73; otherwise, go to block S76.

In block S73, the analysis module 24 compares the video to be tested with the exemplar video. In particular, the analysis module 24 compares frequencies of the video to be tested and the exemplar video and compares each frame of the video to test with a corresponding frame of the exemplar video.

In block S74, it is determined whether differences between the video to be tested and the exemplar video fall with predetermined ranges. If the differences fall within predetermined ranges go to block S85, otherwise, go to block S86.

In block S75, a test pass result is presented.

In block S76, a failure result is presented.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A system for testing a camera module of an electronic device, the system comprising:
    a test fixture comprising a seat for securing the electronic device and a panel pivotally attached to the seat;
    a display screen attached to the panel; and
    an analysis module;
    wherein the camera module is capable of capturing a video and a photo of the display screen, and the analysis module is capable of examining whether the video and the photo fall within predetermined parameters.

2. The system of claim 1, further comprising a control module capable of instructing the camera module to capture the video and the photo.

3. The system of claim 2, further comprising a storage module that stores an exemplar video and an exemplar picture, the analysis module is capable of comparing the video and the photo captured by the camera module with the exemplar video and exemplar picture.

4. The system of claim 3, wherein the control module, the analysis module, and the storage module are installed in the electronic device.

5. The system of claim 1, wherein the display screen is capable of providing motion.

6. The system of claim 1, wherein the test fixture further comprises a rear flange panel and a side flange panel that is substantially perpendicular to the rear flange panel, the seat is configured for supporting the electronic device; the rear flange panel and the side flange panel are configured for securing the electronic device, and a height of the side flange panel is less than that of the rear flange panel.

7. A method for testing a camera module of an electronic device comprising:
    installing an analysis module and a control module in the electronic device;
    providing a test fixture to secure the electronic device;
    attaching an object to the test fixture; the object being configured for being captured by the camera module;
    instructing the camera module to capture a video and a photo from the object; and
    examining whether the video and the photo fall within predetermined parameters.

8. The method of claim 7, wherein the object is a display screen.

9. The method of claim 8, wherein the instructing the camera module to capture the video and the photo comprises: opening a video capturing window; adjusting a screen resolution of the camera module; initializing video parameters; displaying images of the display screen; capturing the photo after a first predetermined time period; and capturing the video after a second predetermined time period.

10. The method of claim 9, wherein the screen resolution of the camera module is adjusted to a maximum value.

11. The method of claim 7, further comprising utilizing a sample electronic device to capture an exemplar video and an exemplar picture.

12. The method of claim 11, wherein the step of examining whether the video and the photo fall within predetermined parameters comprises: comparing the photo with the exemplar picture;
    determining whether differences between the photo and the exemplar picture fall within predetermined ranges.

13. The method of claim 12, further comprising comparing the video with the exemplar video;

if differences between the photo and the exemplar picture and differences between the video and the exemplar video fall within predetermined ranges; a test pass result is presented; if not; a failure result is presented.

14. The method of claims 13, wherein the step of comparing the video captured by the electronic device with the exemplar video comprising comparing frequencies of the video captured by the electronic device and the exemplar video and comparing frames of the video with a corresponding frame of the exemplar video.

* * * * *